United States Patent Office 3,444,033
Patented May 13, 1969

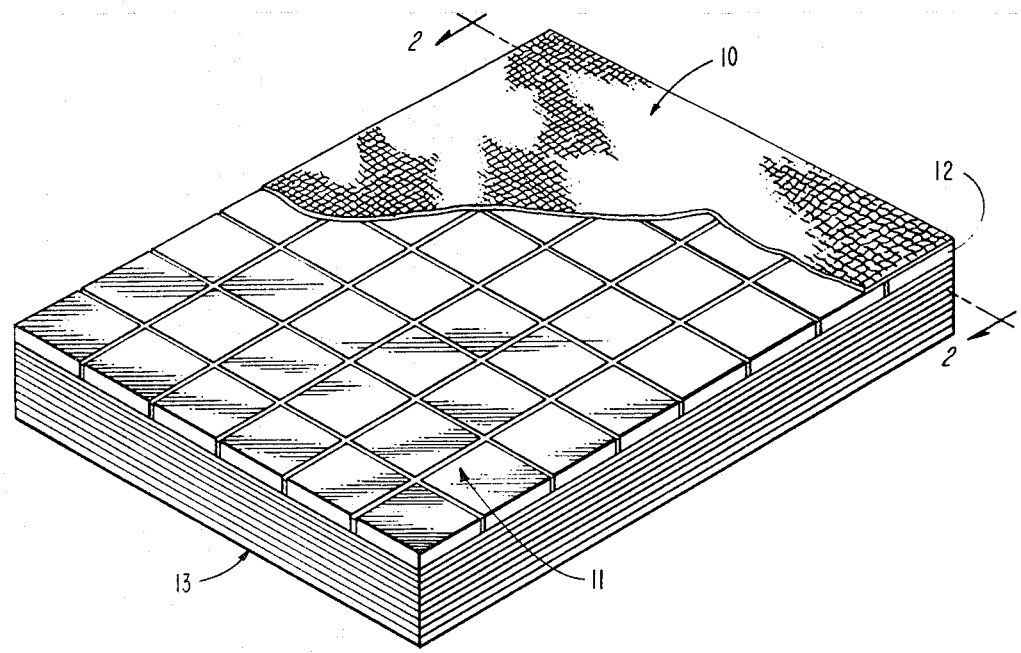
FIG. — 1
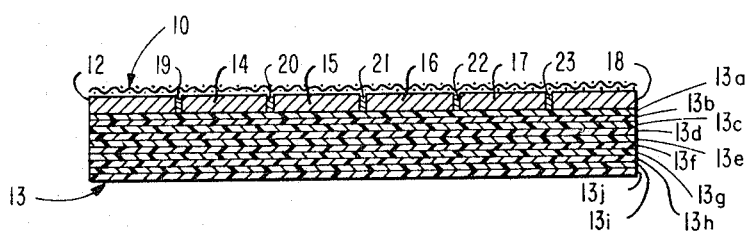
FIG. — 2
INVENTOR
HARRY A. KING
BY Joseph E. Mueth
Edward D. Ansell
ATTORNEYS

3,444,033
LIGHTWEIGHT ARMOR WITH LAMINATE BASE MEMBER RESISTANT TO DELAMINATION
Harry A. King, Covina, Calif., assignor to Aerojet-General Corporation, Azusa, Calif., a corporation of California
Filed June 22, 1964, Ser. No. 376,935
Int. Cl. B32b 25/14, 27/28
U.S. Cl. 161—38                                  8 Claims

ABSTRACT OF THE DISCLOSURE

This disclosure concerns lightweight armor which includes a laminate base member highly resistant to delamination. The laminate base member is formed from a plurality of substantially parallel fibrous reinforcing layers embedded in a resilient polymeric composition. The resilient polymeric composition comprises a resin selected from the group consisting of epoxy resins and phenol-formaldehyde resins and a compatible high molecular weight elastomer selected from the group consisting of acrylonitrile-butadiene copolymers and polyurethane rubbers. A layer of ceramic tiles is adhered to the base member on the side thereof exposed to the impact of a projectile, the ceramic tiles being effective to absorb a substantial portion of the kinetic energy of a projectile by respectively shattering upon the impact of a projectile thereagainst. The projectile then continues into the laminate base member where its remaining kinetic energy is spent. The base member may also have a fire retardant material incorporated therein so that the armor will be highly resistant to combustion thereby being self-extinguishing upon being impacted by an incendiary projectile.

---

This invention relates to an improvement in lightweight armor and the method for manufacturing the same.

Metal armor has long been employed to protect personnel from injury resulting from flying fragments and missiles, such as bullets and the like. This armor, however, suffers from a number of disadvantages. Metal armor is very heavy, and is unsuitable or undesirable in many applications where weight is critical, such as in aircraft and helicopters. Moreover, metal armor is expensive to fabricate into large and complex parts. Because of the many problems incident to the use of metal armor, heretofore there have been developed various types of lightweight plastic armor materials.

In the known lightweight plastic armor materials the base member is commonly formed of a plurality of fibrous layers or mats impregnated with epoxy or polyester resin which have been formed into a unitary laminate by heating the several impregnated fibrous layers under pressure. A major surface of the laminated base is commonly covered with ceramic tiles. These tiles are normally disposed on the side of the laminate upon which the bullet is intended to impact. The purpose of the ceramic tile is to absorb a substantial portion of the impact of the bullet as it strikes the armor material and thereby slow it down so that it may be stopped by the base member.

The lightweight armor material above-described employing polyester or epoxy resin as the plastic impregnating material in the base member has been found to undergo extensive delamination upon impact of a bullet. Thus the lightweight armor plastic material previously known suffers permanent deformation as the result of the bullet impact. Further, as a result of the delamination produced, the armor material is substantially thickened, i.e., bulged, at the point of impact. This thickening of the armor material is undesirable in places where space is limited, such as in a helicopter. Further, bulging indicates that the base member has been permanently damaged, and that the affected area has suffered a loss of structural integrity. For the foregoing reasons, the lightweight armor plate of the prior art must ordinarily be completely replaced once a bullet has impacted. The known lightweight armor also possesses poor resistance to handling and vibration damage.

I have now found that the problem of delamination in lightweight armor plate upon the impact of a bullet may be substantially avoided by employing as the impregnating material for the base member, a composition comprising a mixture of a curable epoxy or phenolic resin and a compatible, elastomeric curable polymer which is preferably an acrylonitrile-butadiene copolymer or a polyurethane rubber. Typical of the suitable impregnating materials I have discovered to be successful in solving the problem of delamination are mixtures of epoxy resin and a butadiene-acrylonitrile copolymer, a phenol-formaldehyde resin and a butadiene-acrylonitrile copolymer, and an epoxy resin and polyurethane rubber. The armor of this invention has also been found to possess improved resistance to vibration and handling damage.

Accordingly, it is an object of this invention to provide a novel lightweight armor material. Still another object of this invention is to provide a new lightweight armor material which is especially resistant to delamination upon impact by flying fragments, bullets and the like. A further object of my invention is the provision of a lightweight armor possessing improved resistance to handling and vibration damage. Yet another object of this invention is to provide a method of forming a novel lightweight armor material which is resistant to delamination upon impact. These and other objects of my invention will be apparent from the detailed description and accompanying drawings illustrating a preferred embodiment thereof.

Before explaining the present invention in detail, it is to be understood that the invention is not limited to the details of construction and arrangement shown in the accompanying drawings, since the invention is capable of other embodiments. Also it is to be understood that the phraseology and terminology employed herein is for purpose of description and not of limittaion.

The novel lightweight armor material of this invention comprises a unitary base member having adherently affixed on one major surface thereof a plurality of tiles; wherein the improvement is provided by having the base member comprised of a plurality of fibrous reinforcing layers in laminar relationship to one another, the layers being substantially parallel to the major surface of the base member, embedded in a tough, cured, resilient polymeric composition comprising a high molecular weight elastomer and a resin compatible therewith and being selected from the group consisting of epoxy resins and phenol-formaldehyde resins.

The novel armor plate material of this invention is depicted in the accompanying drawings of which FIGURE 1 is a perspective view in partial cut-away.

FIGURE 2 is a section on line 2—2 in FIGURE 1.

In FIGURE 1, numeral 10 indicates the woven fabric material, such as nylon, Orlon or Dacron, which is adhered to the surface of the ceramic tiles. Preferably the tiles are ceramic, but other hard brittle materials are also suitable. The tiles are identified by numeral 11, with the right end-most tile along line 2—2 being identified as 12. The tiles are firmly adhered to base member 13.

In FIGURES 2, 12, 14, 15, 16, 17 and 18 are the tile materials along line 2—2 which are adhered to both the fabric 10, and to the base member 13. Interposed between the tiles are separators 19, 20, 21, 22 and 23 which, as shown, serve to prevent contact of one of the ceramic tiles with an adjacent tile. The purpose of these separators, which may be composed of paper, masking tape, cardboard, rubber and the like, is to avoid the transmission of shock from one tile to the other. In this manner, the communication of the shock is substantially reduced and the only tile affected by the bullet is the one upon which the bullet impacts. As can be seen, base member 13 is composed of a plurality of fibrous layers. These layers have been impregnated with the impregnating material of this invention. In the drawing there are shown ten layers, 13a through 13 j. The individual laminate layers are formed into the unitary base by curing under heat and pressure.

While in the drawing, only ten individual laminates are shown, the number of laminates forming the base member may be varied widely. Ordinarily, for armor designed to protect against a 30-caliber round the base member is composed of twenty-four individual layers cured to form an integral mass. The fibrous reinforcing material comprising the individual layers is ordinarily fiberglass. However, other fibrous materials known to those skilled in the art, such as asbestos, may be used.

The method of manufacturing novel lightweight armor material according to this invention comprises saturating fibrous reinforcing layers in a resin solution, arranging a plurality of the saturated layers in juxtaposition, and curing said layers under pressure at elevated temperature to obtain a unitary base member, and adherently affixing to at least one major surface of the base member a plurality of tiles. In this process, the resin medium comprises a high molecular weight curable elastomer and a curable resin compatible therewith and being selected from the group consisting of epoxy resins and phenol formaldehyde resins.

As is apparent from the drawing and the above description, in use, the armor material is positioned so that the bullet or projectile impacts on the side of the armor material which carries the woven fabric. Upon impact the tile positioned immediately below the point of impact shatters, thus absorbing a substantial portion of the kinetic energy of the bullet, with the overlying fabric 10 serving to retain the shattered pieces of the tile and preventing the fragments from coming off in the direction from which the bullet was fired. The bullet then continues into base member 13, where its remaining kinetic energy is spent. Because of the presence of the impregnating material of this invention, the base member is capable of undergoing temporary deformation upon contact with the bullet, absorbing the kinetic energy and then returning to its original dimensions and shape without causing substantial delamination or other permanent alteration of the base member. In this manner it can be seen that the armor plate of this invention can be reused simply by replacing the tile and covering fabric destroyed by the impact of the bullet.

The novel impregnant medium used in the process of this invention to provide the novel armor is a mixture of epoxy resin or phenol-formaldehyde resin with an elastomeric, high molecular weight, chemically curable material.

Typical of suitable epoxy resins are those having the general formula:

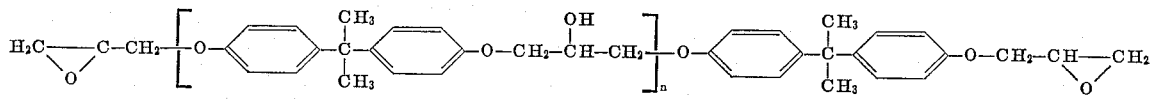

wherein $n$ is zero or integer of from about 1 to about 50. As can be seen from the above equation, the epoxy resin illustrated above are the polyglycidyl ethers of 2,2(4-hydroxypenyl) propane. The epoxy resin employed in the impregnation process of this invention contains one or more well-known epoxy curing agents such as hexahydrophthalic anhydride, methyl nadic anhydride, benzyldimethylamine, dodecanyl succinic anhydride, ethylene diamine and the like.

Preferred epoxy resins for use in this invention include the material sold by Shell Chemical Company under the tradename of Epon 828. This liquid epoxy has a molecular weight of about 400 and a viscosity at 25° C. within the range of from about 5,000 to 15,000 centipoises. Another preferred epoxy is the material sold by Dow Chemical Company under the name DER 332. This liquid epoxy has a molecular weight of about 340 to 350, and a viscosity at 25° C. of from about 3,600 to 6,400 centipoises.

Suitable phenol-aldehydes include those having the generic formula:

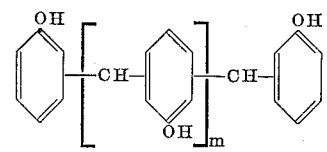

wherein $m$ is an integer of from 1 to about 50. Urea-formaldehyde and melamine-formaldehyde resins may also be employed. The phenolic resins of this invention may contain small effective amounts of curing agents such as hexamethylenetetramine.

In general from about 50 to about 90 parts of the phenolic or epoxy material are used per 100 parts of the high molecular weight, elasomeric, chemically curable material.

Typical of the high molecular weight, curable elasomers which may be used in this invention are the acrylonitrile-butadiene copolymers which consist essentially of the following two repeating units:

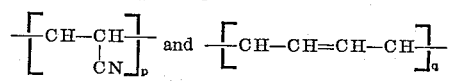

wherein about 20 to 40 percent by weight of the recurring units are of the acrylonitrile. In the copolymer, $p$ and $q$ are integers chosen so that the molecular weight of the polymer is from about 10,000 to about three million. Curing agents and curing accelerators such as sulfur, benzothiozole disulfide, sulfur monochloride, selenium, p-quinone dioxime, 2-mercaptobenzothiozole, zinc diethyldithiocarbamate, tetramethylthiuram disulfide and 1,3-diphenyl guanidine may be used with these copolymers. Likewise, accelerator activators such as zinc oxide, litharge and magnesium oxide may also be used.

Another class of suitable high molecular weight, curable elastomers for this invention are the polyurethanes having the general formula:

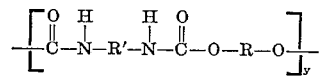

wherein R and R′ are divalent organic radicals which can be the same or different. Thus, R and R′ can be alkylene radicals such as ethylene, hexylene, or octylene; an arylene radical such as para phenylene or substituted phenylenes, or mixed radicals containing, for example, alkyl or aryl groups in a chain such as in the radical 1,4-dimethylene phenylene. $y$ in the above equation is an integer greater than one and represents the number of repeating units in the polymer chain.

It is evident from the above that a wide variety of polyurethane rubbers fall within the foregoing formula. The polyurethane rubbers are normally non-porous, and are usually obtained by reacting a polyisocyanate with a polyfunctional active hydrogen compound, i.e., a compound containing two or more groups such as hydroxy or thiol, in the absence of water. Optionally, other compounds may be present as curing or cross-linking agents. The following diisocyanate compounds are particularly suitable as reactants for the preparation of the polyurethane rubbers:

(a) Alkane diisocyanates, such as: ethylene diisocyanate; trimethylene diisocyanate; tetramethylene diisocyanate; butylene-1,3-diisocyanate; and decamethylene diisocyanate.

(b) Alkene diisocyanates, such as: 1-propylene-1,2-diisocyanate; 1-butylene-1,2-diisocyanate; and 1-butylene-1,3-diisocyanate.

(c) Cycloalkylene diisocyanates, such as: cyclopentylene-1,3-diisocyanate; cyclohexylene-1,3-diisocyanate; cycyohexylene-1,2-diisocyanate; and cyclohexylene-1,4-diisocyanate.

(d) Aromatic diisocyanates, such as: m-phenylene diisocyanate; o-phenylene diisocyanate; p-phenylene diisocyanate; diphenylene-4,4'-diisocyanate; 2,4-tolylene diisocyanate; 2,6-tolylene diisocyanate; 4,4'-diphenylmethane diisocyanate; 1,5-naphthalene diisocyanate; xylylene-1,4-diisocyanate; 4,4'-diphenylenemethane diisocyanate; and 4,4'-diphenylenepropane diisocyanate.

The following dihydroxy compounds are particularly suitable as reactants for the polyurethane rubbers used in this invention:

(1) Alkane diols having a chain length of from 2 to 20 carbon atoms inclusive, such as: 2,2-dimethyl-1,3-propanediol; tetramethylene glycol; hexamethylene glycol; and decamethylene glycol.

(2) Alkene diols, such as: 2-propylene-1,3-diol; 1-butylene-1,2-diol; and 1-hexylene-1,3-diol.

(3) Cycloalkylene diols, such as: cyclopentylene-1,3-diol; cyclohexylene-1,3-diol; and cyclohexylene-1,4-diol.

(4) Aromatic diols, such as: resorcinol; 2-methyl-1,3-naphthalene diol; 2,4-toluenediol; xylylene-1,4-diol; xylylene-1,3-diol; 2-ethyl-1-phenyl-3-butene-1,2-diol; and 2,2-di(4-hydroxyphenyl) propane.

Other dihydroxy compounds suitable for the polyurethane rubbers for use in the armor of this invention are polyesters such as those obtained from the reaction of a dihydric alcohol such as ethylene glycol, diethylene glycol, propylene glycol, or hexamethylene glycol with a dicarboxylic acid such as succinic acid, adipic acid, sebacic acid and related compounds. The polyesters most suitable for purposes of this invention are those having a molecular weight from about 1000 to about 2500.

The above-mentioned polyesters can be prepared from either saturated or unsaturated dihydric alcohols and saturated or unsaturated dicarboxylic acids. The usual manner of making suitable polyesters is to react a mixture of an unsaturated dicarboxylic acid (such as adipic acid, sebacic acid, or the like) or anhydride and a saturated or aromatic dicarboxylic acid or anhydride with a dihydric alcohol. Examples of unsaturated dicarboxylic acids which can be employed are: maleic acid, fumaric acid and citraconic acid.

In addition to the polyesters, polyethers such as polyethylene ether glycols, polypropylene ether glycols, polytetramethylene ether glycols, other polyalkylene ether glycols, and mixtures or copolymers thereof having molecular weights of from about 400 to about 10,000 can be utilized as dihydroxy reactants of the polyurethane reaction of this invention.

It will be appreciated by those skilled in the art that mixtures of suitable polyhydroxy and/or polyisocyanate compounds can be used to prepare polyurethane rubbers for use in the impregnating medium, if desired. A great variety and number of polyfunctional organic compounds will serve as cross-linking agents for the polyurethane rubber useful in this invention. For example, compounds with three or more groups containing reactive hydrogen which are capable of polymerization with isocyanates can be employed. The cross-linking agents of this invention can be saturated or unsaturated; aliphatic or aromatic; open or closed chain.

Examples of compounds which are particularly suitable to cure, i.e., cross-link, the polyurethanes are glycerol monoricinoleate; glycerol triricinoleate; 1,2,6-hexanotriol; methylene bis(orthochloroaniline); monohydroxyethyl trihydroxypropyl ethylenediamine; polyaryl polyisocyanates; pentaerythritolpropylene oxide adduct; N,N,N',N'-tetrakis (2-hydroxypropyl) ethylenediamine; triethanolamine; trimethylolpropane; and triisocyanates, such as toluene-2,4,6-triisocyanate.

These polyurethanes may, optionally, contain carbon-to-carbon unsaturation, as is indicated above. This unsaturation may be present either along the main polymer backbone, or in side chains. Suitable polyurethanes containing side chain unsaturation include those described in U.S. Patent No. 2,808,391, issued Oct. 1, 1957. These materials are curable, using the normal polydiolefin rubber curatives known to those skilled in the art.

Other optional ingredients may be used in the resin medium such as mold release agents, i.e., stearic acid; and fire retardant materials such as antimony trioxide, tricresyl phosphate and chlorinated wax. The mold release agents, if present, are used in an amount from about 1 to about 5 parts by weight per 100 parts of the elastomer material; and the fire retardant materials are used in an amount from about 20 to about 50 parts by weight to 100 parts of the elastomeric material.

In a preferred embodiment of this invention, about 20 to about 40 parts of fire retardant material per 100 parts of elastomeric material are used in the impregnating medium to provide a fire resistant base 13. An armor material thus composed is especially effective against incendiary rounds. The fire retardant material serves to make the base member 13 self-extinguishing.

Other additives may be employed in the resin medium in minor quantities up to about 5 percent by weight, including antioxidants such as N-phenyl-2-naphthylamine; pigments such as carbon black, calcium carbonate and titanium dioxide; and softeners such as petroleum oils and pine tar resins.

The medium used to impregnate the fibrous layers may contain only the mixture of epoxy or phenolic resin and elastomer together with a small amount of curing agent in a solvent; or the additional ingredients mentioned above may be present. Preferably, although not necessarily, the solid materials for the resin medium are first thoroughly blended into a masterbatch on a rubber mill at room temperature prior to being added to the solvent. In this manner a homogeneous resin medium is most expeditiously provided.

The resin medium should have a viscosity of less than about 20,000 centipoises at 25° C., and preferably in the range from 50 centipoises to about 1500 centipoises at 25° C. The ratio of curing agent to epoxy or phenolic plus elastomer may be varied over a wide range. The curing agent should always be present in an amount effective to substantially completely cure the epoxy or phenolic and the elastomer. Normally, the weight ratio of curing agent to epoxy or phenolic plus elastomer is within the range from about 1/1 to about 1/100.

The amount of solvent in the medium should be from about 0.5 to about 40 times the total weight of epoxy or phenolic plus the elastomer, curatives and other additives. The choice of solvent is not critical and any substantially inert volatile material in which the epoxy or phenolic and the elastomer are at least partially soluble may be utilized. Illustrative of suitable solvents are the ketones such as acetone and methyl ethyl ketone, and the hydrocarbons such as benzene and butane.

The epoxy or phenolic and the elastomer in the impregnating medium must be substantially uncured. After dipping the individual layers of fibrous material in the medium any excess present is removed, for example, by passing the layers between rollers. The individual impregnated layers are usually from about 10 to about 100 mils thick, and are stacked to the desired number and then heated, preferably in a mold or press, at a temperature of from about 150° F. to about 500° F. and at a pressure of from 10 to about 20,000 p.s.i.g. to essentially completely cure the epoxy or phenolic, and the elastomer.

The curing process may require from about 0.1 hour to about 10 days, depending on the composition of the resin medium, and the cure temperature and pressure. The cured laminate contains from about 20 to about 75 percent by weight of cured resin and elastomer.

The cured unitary laminated base material 13 thus obtained is sanded smooth on one major side, if required, and then the ceramic tiles 11 are adhesively applied thereto. The tile may be any size or shape, and while only squares are shown in the drawings, rectangles, hexagons, triangles etc. may be used. Preferably the tiles are square, about 6 inches on a side and from 0.05 to about 0.5 inch thick. Commercially available adhesives such as the epoxies may be used to adhere the tile to the base. Over the layer of tiles is then applied the woven fabric 10. This material is also held in place by adhesive. The adhesive between base 13 and tiles 11, and between the tiles and fabric 10 is extremely thin, and thus is not shown in the drawings.

The following example illustrates the manufacture of the armor material of this invention. This example is presented solely for purposes of illustration and should not be regarded as limiting the invention. In the example, the parts are by weight unless otherwise indicated.

EXAMPLE I

On a water-cooled rubber mill operated at room temperature, is combined over a period of about 10 minutes, 100 parts of a solid acrylonitrile-butadiene copolymer (Hycar Resin 1052, manufactured by B. F. Goodrich), 90 parts of a dry powdered phenol-formaldehyde resin (Phenolic Resin 12687, manufactured by Durez), 5.0 parts zinc oxide, 1.5 parts sulfur, 1.5 parts benzothiazole disulfide, and 1.5 parts stearic acid. After this material had been thoroughly mixed into a masterbatch, 100 parts of the material are combined with 200 parts of methyl ethyl ketone solvent. The masterbatch composition readily dissolves in the solvent. Sheets of fiber glass fabric having a thickness of about 22 mils are then dipped into this solution and then the dipped fabric is passed between two rollers in order to squeeze out the excess. This dipping and squeezing process is continued until about 40 percent by weight of the impregnated glass fabric is made up of solid resin composition, and the glass fabric has attained a thickness of about 30 mils. 24 layers of the individual glass fabrics are stacked and cured in a mold for 45 minutes at 320° F., and 1000 p.s.i. The cured stack is then removed from the mold and sanded smooth on one side. To the smooth side is then adhesively bonded 36 ceramic tiles, each tile measuring 6 inches on a side. Then a thin orlon cloth is adhesively bonded to the ceramic tile surface. The commercial adhesive employed for this purpose has the following composition: 100 parts of polyglycidyl ether of 2,2(4-hydroxyphenyl) propane; 125 parts of polysulfide rubber; 10 parts of long fiber asbestos; and 10 parts of an amine curing agent. The foregoing adhesive effectively bonds the ceramic to the base member and the orlon cloth to the ceramic surface at room temperature.

The armor plate prepared in accordance with Example I was tested against a 30-caliber projectile at a distance of ten yards at zero degrees obliquity. In these tests, the armor plate of this invention was tested against two other armor plates which were identical in all respects except that the impregnating material in the base was, in the one case, epoxy resin without any high molecular weight elastomeric material added, and in the other case, polyester resin. The results are set forth in Table I below.

Table I

| | Area of delamination surrounding point of impact, inches in diameter |
|---|---|
| Armor plate of this invention | 0 |
| Armor plate containing epoxy impregnating material | 8 |
| Armor plate containing polyester impregnating material | 7 |

As can be seen from the foregoing data the armor plate of the present invention is substantially superior to the known armor plate of the prior art in overcoming the problem of delamination.

Unlike the armor plate of the prior art, the material I have invented may be re-used simply by replacing the shattered ceramic tile on the surface of the base member and patching the overlying fabric. As the foregoing data show, the structural integrity of the base member is not permanently altered by the impact of the bullet.

There follows additional masterbatch formulations which also may be dissolved in a solvent and used to impregnate the fibrous layers used in preparing the base member of this invention in the manner described in Example I.

EXAMPLE II

| Ingredients: | Parts by weight |
|---|---|
| Acrylonitrile-butadiene copolymer | 100.0 |
| Phenol-formaldehyde resin | 50.0 |
| Zinc oxide | 5.0 |
| Sulfur | 1.5 |
| Benzothiazole disulfide | 1.5 |
| Stearic acid | 1.5 |
| Tricresyl phosphate | 30.0 |

EXAMPLE III

| Ingredients: | Parts by weight |
|---|---|
| Acrylonitrile-butadiene copolymer | 100.0 |
| Epoxy resin (Epon 828) | 50.0 |
| Zinc oxide | 5.0 |
| Sulfur | 1.5 |
| Benzothiazole disulfide | 1.5 |
| Stearic acid | 1.5 |
| Tricresyl phosphate | 30.0 |

It should be understood that many variations of the foregoing formulations and techniques are possible. One preferred technique that has been found to be advantageous is to prepare a very dilute resin medium containing about 1 part of masterbatch in about 10 parts of methyl ethyl ketone, dipping the fibrous layers in this solution, squeezing out the excess solution by passing through rollers, repeating this process until up to 10 to 20 percent of the total weight of the glass fabric is made up of resin; and thereafter continuing the incorporation of the balance of the resin up to about 30 to 45 percent by weight based on the total weight of the impregnated fibrous layer, using a more concentrated resin medium containing about 1 part of masterbatch per two parts of methyl ethyl ketone.

I have also found that the best results are obtained when about 90 parts of phenol-formaldehyde or epoxy resin are employed per 100 parts of the high molecular weight elastomeric material in the masterbatch. In this way the necessary flexibility is provided to prevent delamination and at the same time the armor is sufficiently rigid to be useful as a structural or load bearing member.

I claim:

1. In a lightweight armor material, a unitary laminated plate-like base member comprising a plurality of fibrous reinforcing layers in laminar relationship to one another, the layers being substantially parallel to a major surface of the base member and being embedded in a tough, cured, resilient polymeric composition comprising a resin selected from the group consisting of epoxy resins and phenol-formaldehyde resins, and a high molecular weight elastomer compatible therewith; and said resilient polymeric composition bonding said plurality of fibrous reinforcing layers together in a unitary composite solid non-porous structure which is highly resistant to delamination into its individual laminate layers upon being impacted by a high energy particle, said unitary composite solid non-porous structure being capable of undergoing temporary deformation upon the impact of the high energy particle, absorbing kinetic energy from the particle, and returning to its original state.

2. In a lightweight armor material, a unitary laminated plate-like base member comprising a plurality of fibrous reinforcing layers in laminar relationship to one another, the layers being substantially parallel to a major surface of the base member and being embedded in a tough, cured, resilient polymeric composition comprising a high molecular weight elastomer selected from the group consisting of acrylonitrile-butadiene copolymers and polyurethane rubbers, and a resin compatible therewith and being selected from the group consisting of epoxy resins and phenol-formaldehyde resins; and said resilient polymeric composition bonding said plurality of fibrous reinforcing layers together in a unitary composite solid non-porous structure which is highly resistant to delamination into its individual laminate layers upon being impacted by a high energy particle, said unitary composite solid non-porous structure being capable of undergoing temporary deformation upon the impact of the high energy particle, absorbing kinetic energy from the particle, and returning to its original state.

3. In a lightweight armor material, a unitary laminated plate-like base member comprising a plurality of fibrous reinforcing layers in laminar relationship to one another, the layers being substantially parallel to a major surface of the base member and being embedded in a tough, cured, resilient polymeric composition comprising a high molecular weight elastomer selected from the group consisting of acrylonitrile-butadiene copolymers and polyurethane rubbers, a resin compatible therewith and being selected from the group consisting of epoxy resins and phenol-formaldehyde resins, and a fire retardant material; and said resilient polymeric composition bonding said plurality of fibrous reinforcing layers together in a unitary composite solid non-porous structure which is highly resistant to delamination into its individual laminate layers upon being impacted by a high energy particle and is highly resistant to combustion so as to be self-extinguishing upon being impacted by a high energy particle of an incendiary nature, said unitary composite solid non-porous structure being capable of undergoing temporary deformation upon the impact of the high energy particle, absorbing kinetic energy from the particle, and returning to its original state.

4. In a lightweight armor material, a unitary laminated plate-like base member comprising a plurality of reinforceing layers of fiber glass fabric in laminar relationship to one another, the layers being substantially parallel to a major surface of the base member and being embedded in a tough, cured, resilient polymeric composition comprising a high molecular weight elastomer selected from the group consisting of acrylonitrile-butadiene copolymers and polyurethane rubbers, a resin compatible therewith and being selected from the group consisting of epoxy resins and phenol-formaldehyde resins, and a fire retardant material; said resilient polymeric composition comprising by weight from about 50 to about 90 parts of said resin, and from about 20 to about 50 parts of said fire retardant material per 100 parts of said elastomer; and said resilient polymeric composition bonding said plurality of reinforcing layers of fiber glass fabric together in a unitary composite solid non-porous structure which is highly resistant to delamination into its individual laminate layers upon being impacted by a high energy particle and is highly resistant to combustion so as to be self-extinguishing upon being impacted by a high energy particle of an incendiary nature, said unitary composite solid non-porous structure being capable of undergoing temporary deformation upon the impact of the high energy particle, absorbing kinetic energy from the particle, and returning to its original state.

5. A lightweight armor material comprising a unitary laminated plate-like base member having adherently affixed on one major surface thereof a plurality of ceramic tiles, said tiles comprising a layer of energy-dissipating elements for absorbing a substantial portion of the impact of a high energy particle and being separated from each other by, and having disposed along their lateral surfaces, solid shock absorbent material; the improvement wherein the said base member comprises a plurality of fibrous reinforcing layers in laminar relationship to one another, the layers being substantially parallel to said major surface of the base member and being embedded in a tough, cured, resilient polymeric composition comprising a high molecular weight elastomer selected from the group consisting of acrylonitrile-butadiene copolymers and polyurethane rubbers, and a resin compatible therewith and being selected from the group consisting of epoxy resins and phenol-formaldehyde resins; and said resilient polymeric composition bonding said plurality of fibrous reinforcing layers together in a unitary composite solid non-porous structure which is highly resistant to delamination into its individual laminate layers upon being impacted by a high energy particle penetrating said layer of ceramic tiles, said unitary composite solid non-porous structure being capable of undergoing temporary deformation upon the impact of the high energy particle, absorbing kinetic energy from the particle, and returning to its original state.

6. A lightweight armor material comprising a unitary laminated plate-like base member having adherently affixed on one major surface thereof a plurality of ceramic tiles, said tiles comprising a layer of energy-dissipating elements for absorbing a substantial portion of the impact of a high energy particle and being separated from each other by, and having disposed along their lateral surfaces, solid shock absorbent material, and a layer of thin woven fabric material providing a spall shield adhered to and covering the outer surface of said ceramic tiles; the improvement wherein the said base member comprises a plurality of fibrous reinforcing layers in laminar relationship to one another, the layers being substantially parallel to said major surface of the base member and being embedded in a tough, cured, resilient polymeric composition comprising a high molecular weight cured elastomer selected from the group consisting of acrylonitrile-butadiene copolymers and polyurethane rubbers, and a resin compatible therewith and being selected from the group consisting of epoxy resins and phenol-formaldehyde resins; and said resilient polymeric composition bonding said plurality of fibrous reinforcing layers together in a unitary composite solid non-porous structure which is highly resistant to delamination into its individual laminate layers upon being impacted by a high energy particle penetrating said layer of ceramic tiles, said unitary composite solid non-porous structure being capable of undergoing temporary deformation upon the impact of the high energy particle, absorbing kinetic energy from the particle, and returning to its original state.

7. A lightweight armor material comprising a unitary laminated plate-like base member having adherently affixed on one major surface thereof a plurality of ceramic tiles, said tiles comprising a layer of energy-dissipating elements for absorbing a substantial portion of the impact of a high energy particle and being separated from each other by, and having disposed along their lateral surfaces, solid shock absorbent material; the improvement wherein the said base member comprises a plurality of fibrous reinforcing layers in laminar relationship to one another, the layers being substantially parallel to said major surface of the base member and being embedded in a tough, cured, resilient polymeric composition comprising a high molecular weight elastomer selected from the group consisting of acrylonitrile-butadiene copolymers and polyurethane rubbers, and a resin compatible therewith and being selected from the group consisting of epoxy resins and phenol-formaldehyde resins; said resilient polymeric composition comprising by weight from about 50 to about 90 parts of the resin per 100 parts of the elastomer; and said resilient polymeric composition bonding said plurality of fibrous reinforcing layers together in a unitary composite solid non-porous structure which is highly resistant to delamination into its individual laminate layers upon being impacted by a high energy particle penetrating said layer of ceramic tiles, said unitary composite solid non-porous structure being capable of undergoing temporary deformation upon the impact of the high energy particle, absorbing kinetic energy from the particle, and returning to its original state.

8. A lightweight armor material comprising a unitary laminated plate-like base member having adherently affixed on one major surface thereof a plurality of ceramic tiles, said tiles comprising a layer of energy-dissipating elements for absorbing a substantial portion of the impact of a high energy particle and being separated from each other by, and having disposed along their lateral surfaces, solid shock absorbent material, and a layer of thin woven fabric material providing a spall shield adhered to and covering the outer surface of said ceramic tiles; the improvement wherein the said base member comprises a plurality of fibrous reinforcing layers in laminar relationship to one another, the layers being substantially parallel to said major surface of the base member and being embedded in a tough, cured, resilient polymeric composition comprising a high molecular weight cured elastomer selected from the group consisting of acrylonitrile-butadiene copolymers and polyurethane rubbers, and a resin compatible therewith and being selected from the group consisting of epoxy resins and phenol-formaldehyde resins; said resilient polymeric composition comprising by weight from about 50 to about 90 parts of the resin per 100 parts of the elastomer, and said resin and said elastomer comprising 20–75% by weight of said base member; and said resilient polymeric composition bonding said plurality of fibrous reinforcing layers together in a unitary composite solid non-porous structure which is highly resistant to delamination into its individual laminate layers upon being impacted by a high energy particle penetrating said layer of ceramic tiles, said unitary composite solid non-porous structure being capable of undergoing temporary deformation upon the impact of the high energy particle, absorbing kinetic energy from the particle, and returning to its original state.

References Cited

UNITED STATES PATENTS

| | | | |
|---|---|---|---|
| 2,399,184 | 4/1946 | Heckert | 161—404 XR |
| 2,673,824 | 3/1954 | Biefeld et al. | 161—204 |
| 2,733,177 | 1/1956 | Meyer | 161—404 XR |
| 2,771,384 | 11/1956 | Collins | 2—2.5 XR |
| 3,018,210 | 1/1962 | Frieder et al. | 156—293 XR |
| 3,242,230 | 3/1966 | Habib | 260—841 |
| 2,960,424 | 11/1960 | Bjorholm. | |
| 3,034,939 | 5/1962 | Newkirk et al. | 161—403 XR |
| 3,058,941 | 10/1962 | Birum | 161—190 XR |

ROBERT F. BURNETT, *Primary Examiner.*

W. A. POWELL, *Assistant Examiner.*

U.S. Cl. X.R.

89—36; 156—300, 330, 335; 161—39, 93, 184, 190, 403, 404; 244—121